No. 889,660. PATENTED JUNE 2, 1908.
W. E. COLENSO.
REIN HITCHING DEVICE.
APPLICATION FILED FEB. 11, 1907.

2 SHEETS—SHEET 1.

Inventor
W. E. Colenso

Witnesses
By
Attorneys

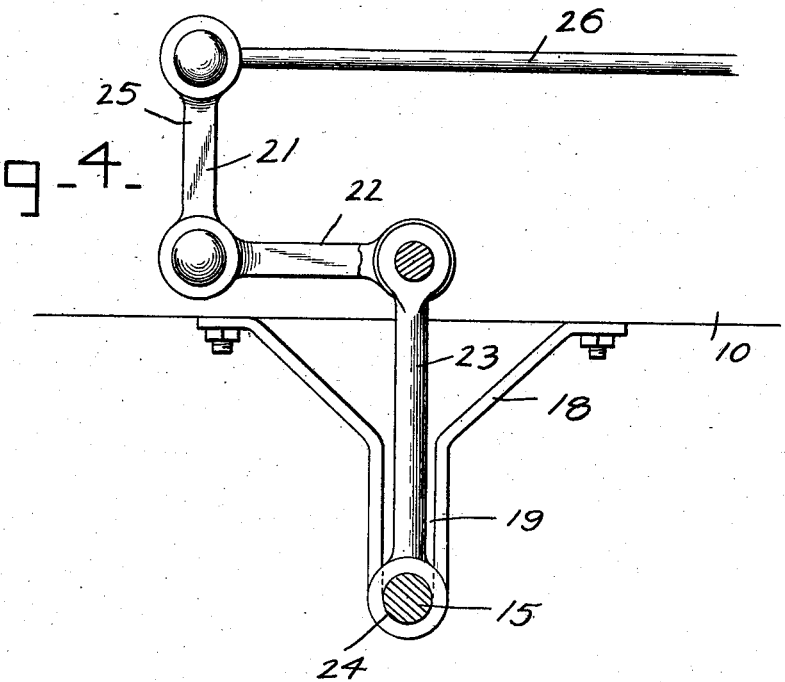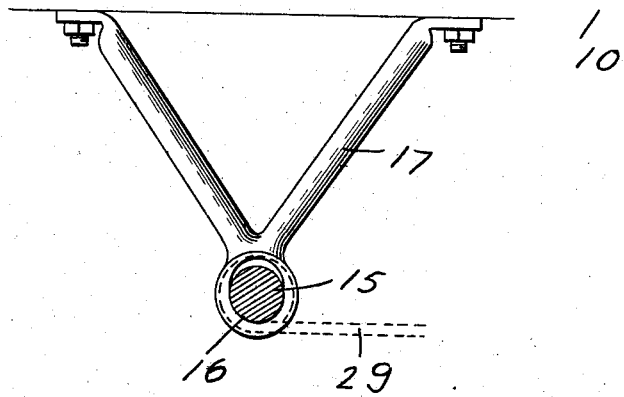

UNITED STATES PATENT OFFICE.

WALTER E. COLENSO, OF GALLUP, TERRITORY OF NEW MEXICO.

REIN-HITCHING DEVICE.

No. 889,660.      Specification of Letters Patent.      Patented June 2, 1908.

Application filed February 11, 1907. Serial No. 356,764.

*To all whom it may concern:*

Be it known that I, WALTER E. COLENSO, a citizen of the United States, residing at Gallup, in the county of McKinley, Territory of New Mexico, have invented certain new and useful Improvements in Rein-Hitching Devices; and I do hereby declare the following to be a full, clear, and exact description of the invention, such as will enable others skilled in the art to which it appertains to make and use the same.

This invention has relation to that class of devices that are designed to prevent a horse or team of horses hitched to a vehicle from running away during the temporary absence of the driver, by connecting the reins with a winding means, operable from a wheel of the wagon, so that when the horse starts forward the said winding means will draw the reins backward and restrain any considerable advancement of the horse.

It is the object of my improvements to provide a thoroughly efficient and exceedingly simple and inexpensive device for the purpose described.

The nature of the invention is disclosed in the device portrayed in the annexed drawings, forming a part of this specification, in view of which it will be first described with respect to its construction and mode of operation and then be pointed out in the subjoined claims.

Figure 2:
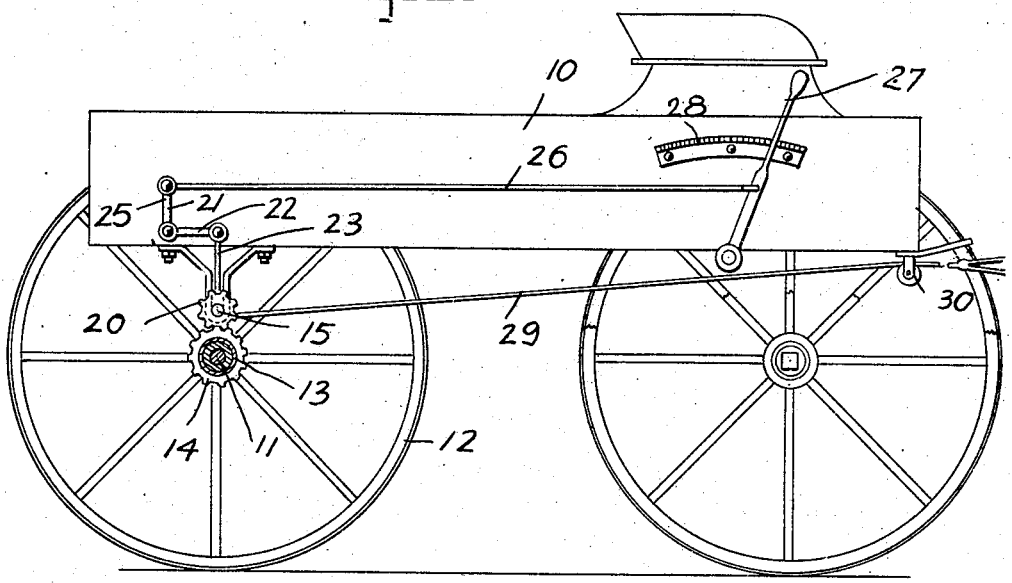
Figure 1:
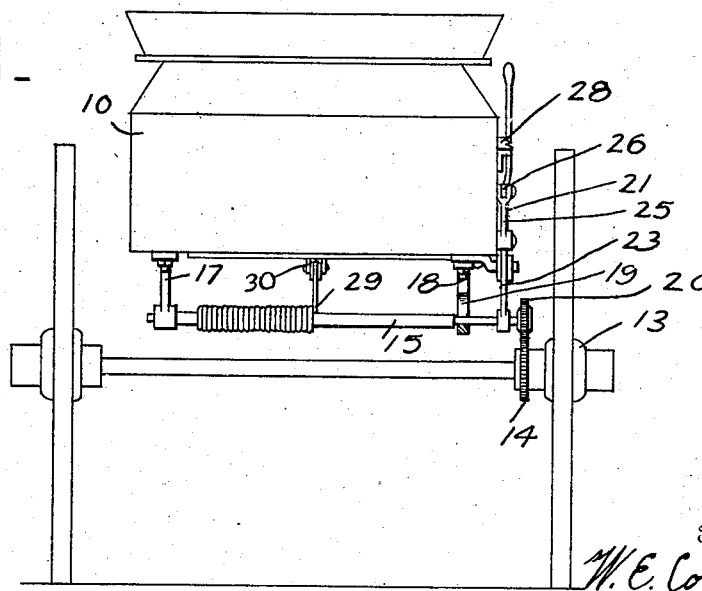

Of the said drawings—Figure 1 is a rear view of a portion of a wagon or vehicle showing my invention applied. Fig. 2 is a longitudinal sectional view of the body and the rear axle and one wheel, the running gear and forward part of the vehicle being omitted for the sake of clearness of illustration. Fig. 3 is a section in a line transversely of the axle showing the support for the winding shaft. Fig. 4 is a detailed sectional view showing the manner of connecting the operating rod with the winding shaft for throwing the gear thereof into and out of mesh with the gear on the axle.

Similar numerals of reference designate similar parts or features, as the case may be, wherever they occur.

In the drawings, 10 designates the body of a vehicle, of which 11 is the rear axle and 12 are the wheels thereof.

13 designates the hub of the right hand hind wheel of the vehicle as viewed in Fig. 1, on the inner end of which there is a toothed collar 14 which is adapted to be rotated as the wheel and its hub are rotated on the axle.

15 designates, what for the purposes of this specification is termed the "winding shaft," which is supported on its inner end in an eye 16 formed in the lower end of a V-shaped hanger 17.

18 designates a hanger having the upper ends of its arms divergent, while the lower ends extend in parallelism, forming a slot 19 in which the outer end portion of the winding shaft 15 rests so that said shaft may be raised or lowered in said slot in order to bring the toothed pinion 20 secured on the end thereof into mesh with the toothed collar 14 or raised out of connection therewith. The element 18 is essentially a hanger being adapted to be secured at its upper end to the bottom of the wagon bed and to depend therefrom. Said hanger is practically slotted at its lower end which slot is vertically disposed and supports the shaft 15 in its lower end, so that the shaft can be raised and lowered to fall of its own gravity.

21 designates a bell-crank lever fulcrumed at its angle point on the wagon box and having the end of its horizontal arm 22 connected pivotally to the upper end of a link 23, the lower end of which link is provided with an eye 24 through which the winding spindle 15 extends.

25 designates the vertical arm of the bell-crank lever 21 the upper end of which is connected with the rear end of a rod 26, the forward end of which rod is connected with an operating lever 27 fulcrumed on the side of the wagon body in proximity to the seat thereon and having a notched-locking or holding means 28 such as is common in connection with the operating lever of the lock on a wagon for holding the operating lever 27 in any position to which it way be moved.

29 designates a flexible cord or strap which is connected at its rear end with the winding shaft 15 around which part of it is normally wound and extending forward to the front end of the vehicle where it is connected as at 30 to two small lines, which are snapped or buckled to the bits of the horses when they are hitched up.

In the construction described, it will be noted that by moving the operating lever 27 forward so as to lower the gear 20 by its own gravity into mesh with the gear collar 14 and supposing the reins to be connected at their rearward ends with the flexible strap 29, and at their forward ends with the horse's bit, if a wagon should be moved forward, as it would be if the team or horses should go forward or attempt to run away the said strap will be wound around the winding shaft, drawing back on the reins and as a consequence drawing back on the horses, stopping them or causing them to desist in moving forward and backing them so that the flexible strap will unwind from the winding shaft and the tension on the rein will be relaxed. Again upon the driver resuming his place in the wagon and taking up the reins, at the same time moving the operating lever 27 backward, as this will place the winding shaft 15 with its wheel 20 out of engagement with the gear collar 14 on the hub of the wheel so that the vehicle may move forward without any effect upon the reins.

It is to be noted that by my improvements, a rein-holding device is provided that is certain in its operation, easy of attachment to any ordinary vehicle and is exceedingly inexpensive, besides being the minimum of simplicity.

The several parts may be purchased and applied by a farmer or any mechanic of ordinary skill, so that it is not necessary to go to the expense of hiring an artisan, charging a high price for his services to either apply the device or remove it from a vehicle.

What is claimed is—

A rein-hitching device comprising a vehicle and its body, combined with a wheel-hub, a gear collar on the inner end of the hub, a slotted hanger connected with the bottom of the body, a second hanger also connected with the bottom of the body and provided in its lower end with an eye, a winding shaft supported at its inner end in the eye of the second hanger and resting at its outer part in the slot of the first hanger, a gear on the outer end of the shaft adapted to be lowered into and raised out of operation with the gear-collar, a bell-crank fulcrumed on the wagon-box, a link connected at one end with the winding shaft and at the other end with one arm of the bell-crank, a rod connected at its rear end to the other end of the bell-crank and at its other end with an operating and locking lever, and flexible means connected at one end with the winding shaft and adapted to have the reins connected with its other end.

In testimony whereof, I affix my signature, in presence of two witnesses.

WALTER E. COLENSO.

Witnesses:
JOHN S. BOWIE,
JAS. G. SNESSON.